(12) United States Patent
Eriksson et al.

(10) Patent No.: US 6,920,490 B2
(45) Date of Patent: Jul. 19, 2005

(54) COMMUNICATION NETWORK AND METHOD THEREIN

(75) Inventors: Göran Eriksson, Sundbyberg (SE); Jan Höller, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 734 days.

(21) Appl. No.: 09/839,100

(22) Filed: Apr. 20, 2001

(65) Prior Publication Data

US 2002/0023149 A1 Feb. 21, 2002

(30) Foreign Application Priority Data

Apr. 28, 2000 (EP) ............................................. 00850075

(51) Int. Cl.[7] ........................ G06F 15/177; G06F 15/16
(52) U.S. Cl. ........................ 709/220; 709/227; 709/228; 709/229
(58) Field of Search ........................ 709/217, 220–222, 709/227–229; 370/254, 259–261

(56) References Cited

U.S. PATENT DOCUMENTS 5,528,677 A    6/1996    Butler et al. ................. 379/196

FOREIGN PATENT DOCUMENTS

| EP | 0 762 789 A3 | 3/1997 |
|---|---|---|
| EP | 0 762 789 A2 | 3/1997 |
| EP | 0 781 057 A2 | 6/1997 |
| WO | WO 95/30317 | 11/1995 |
| WO | WO 00/11885 | 3/2000 |
| WO | WO 00/11886 | 3/2000 |

OTHER PUBLICATIONS

Guedes, L.A. et al. "An Agent–Based Approach for Supporting Quality of Service in Distributed Multimedia Systems". XP004146586. Computer Communications. vol. 21, No. 14. Sep. 15, 1998. pp. 1269–1278.

Guedes, L.A. et al. "QoS Agency: An Agent–Based Architecture for Supporting Quality of Service in Distributed Multimedia Systems". 1997 IEEE Conference on Protocols for Multimedia Systems–Multimedia Networking. ISBN 0818679166. Nov. 1997. pp. 204–211.

(Continued)

*Primary Examiner*—Jeffrey Gaffin
*Assistant Examiner*—David Martinez

(57) ABSTRACT

The invention is concerned with a method in a communication network for invoking services, the communication network comprising at least one or more terminals and at least two service entities. In the method the terminal deduces necessary support and service components for providing an end-user service. A set of configuration requests is the constructed at the terminal, each associated with one or more specific service entities for invoking individual service components composing a service. Each configuration request is forwarded from the terminal to the service entity/entities indirectly, by using a special network support function for configuring service entities—the assembler unit of the invention—or directly in a way, which is chosen in accordance with pre-defined criteria. The invention is also concerned with a communication network, a terminal and an assembler unit to perform the method.

6 Claims, 5 Drawing Sheets

OTHER PUBLICATIONS

La Porta, Thomas et al. "Experiences With Network–Based User Agents for Mobile Applications". 1998 Mobile Networks and Applications. vol. 3, No. 2. ISSN 1383–469X. pp. 123–141.

Lombardo, Alfio et al. "Performance Evaluation of an Allocation Strategy for TINA Compliant Mobile Agents Supporting PCS in a Multi–Retailer Environment". 1999 Intelligence in Services and Networks. Paving the Way for an Open Service Market. ISBN 3540658955. Apr. 1999. pp. 401–415.

Ramjee, Ramachandran et al. "The use of Network–Based Migrating User Agents for Personal Communication Services". 1995 IEEE Personal Communications. vol. 2, No. 6. ISSN: 1070–9916. pp. 62–68.

Seitz, J. et al. "Management of Proxy Objects Providing Multimedia Applications in the Mobile Environment". Integrated Network Management VI. Distributed Management for the Networked Millennium. Proceedings of the Sixth IFIP/IEEE International Symposium on Integrated Network Management. ISBN 0780357485. May 1999. pp. 915–928.

European Search Report as completed by Examiner R. Chassatte, on Sep. 22, 2000, in connection to European Application No. 00850075.

International Search Report as completed by Examiner R. Chassatte, on Aug. 21, 2001, in connection to International Application No. PCT/EP01/04381 as filed Apr. 18, 2001.

Type 3 Search Report as prepared by WPT Searches and Consulting in connection to "Service Assembly in an IP–network".

_COMMUNICATION NETWORK AND METHOD THEREIN_

TECHNICAL FIELD

The invention is concerned with a communication network and a method therein for invoking services to one or more terminals from at least two service entities. The invention is also concerned with a terminal and a an assembler unit to be used in the communication network.

BACKGROUND ART

Network support of conventional end user services (e.g. telephony) of today are mostly monolithically packaged to be invoked from a user terminal from a service entity belonging to one service provider.

In a de-regulated market, which is the trend of today, the traditionally bundled, packaged network support of end-user services may be decomposed into constituting sub-components when the packaged services from a particular service provider are not used. Each of these constituting components may then be offered separately to the end-users by several different service providers, allowing the end-user to choose with whom to establish a business relation and thereby be allowed to invoke the individual service component. One service provider may also have many instances, service entities, of the same service component, e.g. geographically distributed. The end-user may also choose between the different service entities.

For example, in a multimedia conversation, individual service components, such as a conference unit, a transcoder, an encryption service, a multiplexer, etc. may be required and the end-user may invoke each of these from his terminal, as e.g. were they end-points in a conference.

Such a procedure would however have some drawbacks, e.g. result in a heavy signalling load, which in case of a cellular link has a high price in terms of spectrum cost. For a cellular operator, even savings in terms of single percentages counts, which is why signalling should be decreased if a cellular transport is used.

Furthermore, the terminal control logic complexity is increased in such a procedure, which also is a drawback.

The existing telecommunication networks, such as ISDN or GSM, use network based call control entity, not terminal based call control. In an IP-network, terminal based call control is an option.

Prior art methods exist which are meant to decrease signaling when invoking services. In the European Patent Application EP 0 762 789 A2, a network based agent performs complex signaling functions related to call processing on behalf of an associated mobile terminal, thus reducing the amount of signaling traffic that must travel over the valuable air interface.

Also agencies for establishing and maintaining desired Quality of Service (QoS) in wired systems are known. Such an architecture is described in the article "QoS Agency: An agent based Architecture for supporting Quality of service in Distributed Multimedia Systems" by L. A. Guedes et al, 1997 IEEE Conference on Protocols for Multimedia Systems-Multimedia Networking PROMS-MnNet (Cat. No 97TB100116) p. 204–12, ISBN 0818679166, 24–27 Nov. 1997.

An object of the invention is to give more freedom of choice for a terminal with respect to decisions about how services or service components implemented in a service entity, are controlled, e.g. how the terminal invokes services and service components and to realize this without a complex terminal control logic.

An object of the invention is also to decrease the overall signaling load in the network.

SUMMARY OF THE INVENTION

The method of the invention is performed in a communication network for invoking services, wherein the communication network comprises at least one or more terminals and at least two service entities. It is deduced at the terminal, by e.g. its control logic, what support and what service components that are necessary for providing a given end-user service. The terminal has in an unspecified manner identified service entities in the network which can provide the service component required. The terminal then constructs configuration requests, each of which is associated with one or more specific service entities for invoking individual service components composing a service. Each configuration request is forwarded from the terminal to the service entity/entities indirectly, by using a special network support function for configuring service entities—the assembler unit of the invention—or directly in a way, which is chosen in accordance with pre-defined criteria.

The communication network and the terminal of the invention has means for performing the method of the invention. Especially, it is mentioned that the terminal can decide the way for forwarding each configuration request in accordance with the pre-defined criteria, in other words it can choose in which extent it desires to use network support in the configuration and distribution of the service requests and it can also decide not to use network support at all.

The assembler unit of the invention is characterised by means for handling the configuration request(s) sent from a terminal in the communication network, each of them associated with one or more specific service entities for invoking individual service components.

The means for handling the configuration request(s) preferably consist of means to analyse and distribute the set of configuration requests accordingly to the service entities in a way chosen by the terminal.

Another preferred embodiment of the assembler unit is that the means for handling the configuration requests consist of means to distribute the requests to the service entities in a way influenced at least partly by the assembler unit. Then these means to forward the requests to the service entities in a way chosen at least partly by the assembler unit can comprise means to analyse at least one of the requests sent by the terminal and means to send the least one of the configuration requests via a further assembler unit in the communication network to the service entities. The terminal might for example give alternatives for the assembler to use some of the service components and the assembler might make its decision about which of the service components to choose based on a geographical analysis.

Thus, a unit is introduced in the network giving support in that it can act on the behalf of the terminal and which, on its explicit request, invokes other service entities as requested on a case-by case principle. This unit, here called an assembler unit, receives request from the user terminal. The assembler unit analyses the request and distributes individual configuration requests to the service units in question.

It is, however, the terminal that primarily decides the service components needed for a given service. The terminal has thus more control over decisions of which service components and which service entity (one or more) to invoke for a given service. If the terminal finds it convenient, it uses the service unit for one or more, usually all of the configuration requests. This decision made by the terminal takes place in accordance with pre-defined criteria, which might depend on geographical position, price, available equipment, signalling amounts, spectrum allocation and desired performance/characteristics.

As was mentioned above, the analysis of which service components that are needed to get a complete end-user service is primarily performed at the terminal. When the terminal decides to use the assembler unit for support in configuring the individual service components, the service entity analyses the service configuration request and distributes them to the different service entities.

The assembler unit might only act on behalf of the terminal without any own intelligence. Alternatively, it may have some intelligent functions e.g. in the composing of the service by and in deciding how to distribute the requests. It might consider the need for assembling at least part of the requests in the set of request and use some further service unit to forward them. It might even have means for reporting the outcome of the terminal's original request.

The invention focuses on terminal control. It is terminal control logic which analyses the need of service components on a case-by-case principle and, if network support from an assembler unit is needed for configuring and distributing the service components.

By placing more control in the terminal, solutions providing more user control are facilitated. The invention both allows for a solution in which the best of the available service components to be used in implementing the session on a case-by-case principle with respect to decreasing spectrum cost, total service configuration time as well as lowering terminal complexity. Furtherrmore, signalling over the air interface can be decreased.

The basic underlying principle is to have the simplest possible procedure possible. Recognizing that in most situations, the terminals will no require any other network support than a transport, the invention provides a mechanism in which the terminal chooses to require support to configure service entities in the network, in the situations where these are needed. Then and only then are these support entities invoked. The benefit is simplicity—only invoke the more complex network support entities when needed.

The invention also allows the end-user to directly establish a business relation with individual service component providing operators, while at service invocation let a $3^{rd}$ party support in assembling the different services, e.g. to a multimedia service. Introducing an assembler unit also opens up for new roles for operators which runs the assembly service without having to own the service entities it interacts with.

FIGURES

DETAILED DESCRIPTION

Some examples of embodiments of the invention are presented in the following, which are not meant to restrict the invention. In these examples, most of the intelligence and the decisions are made in the terminal, but as has been indicated earlier in the text, the assembler might be given more intelligence and it might make a part of the decisions with respect to distributing and composing the service for the terminal. The terminal might also decide not to use the assembler unit as support for invoking the desired service.

Figure 1:
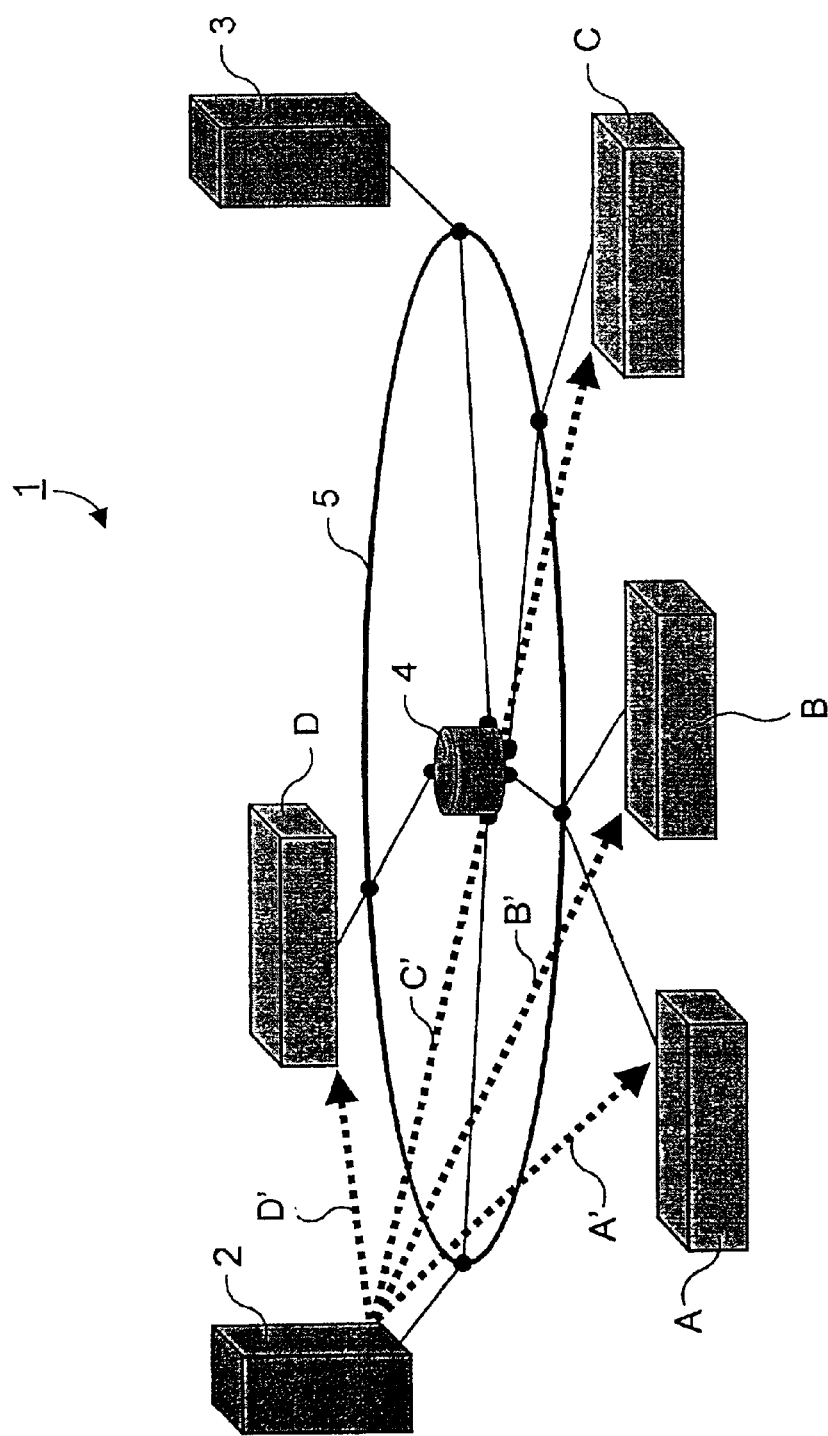
FIG. 1 shows the architecture and method principle in the existing solution to invoke services from several service entities.

In the architecture of FIG. 1, which is used in existing prior art solutions when a terminal can use several service entities or service providers for invoking services, the telecommunication network 1 comprises a terminal 2, another terminal 3, a router 4 for routing IP packets sent by the terminals to the right end-point, and several service entities (service providing entities) A, B, C and D. The cellular link layer is indicated with 5, which gives the functionality for the terminals to communicate over radio waves.

When the terminal 2 wishes to invoke services from the different service entities A, B, C and D, it sends a separate message to each one of them as indicated by the dotted lines A', B', C' and D'.

Figure 2:
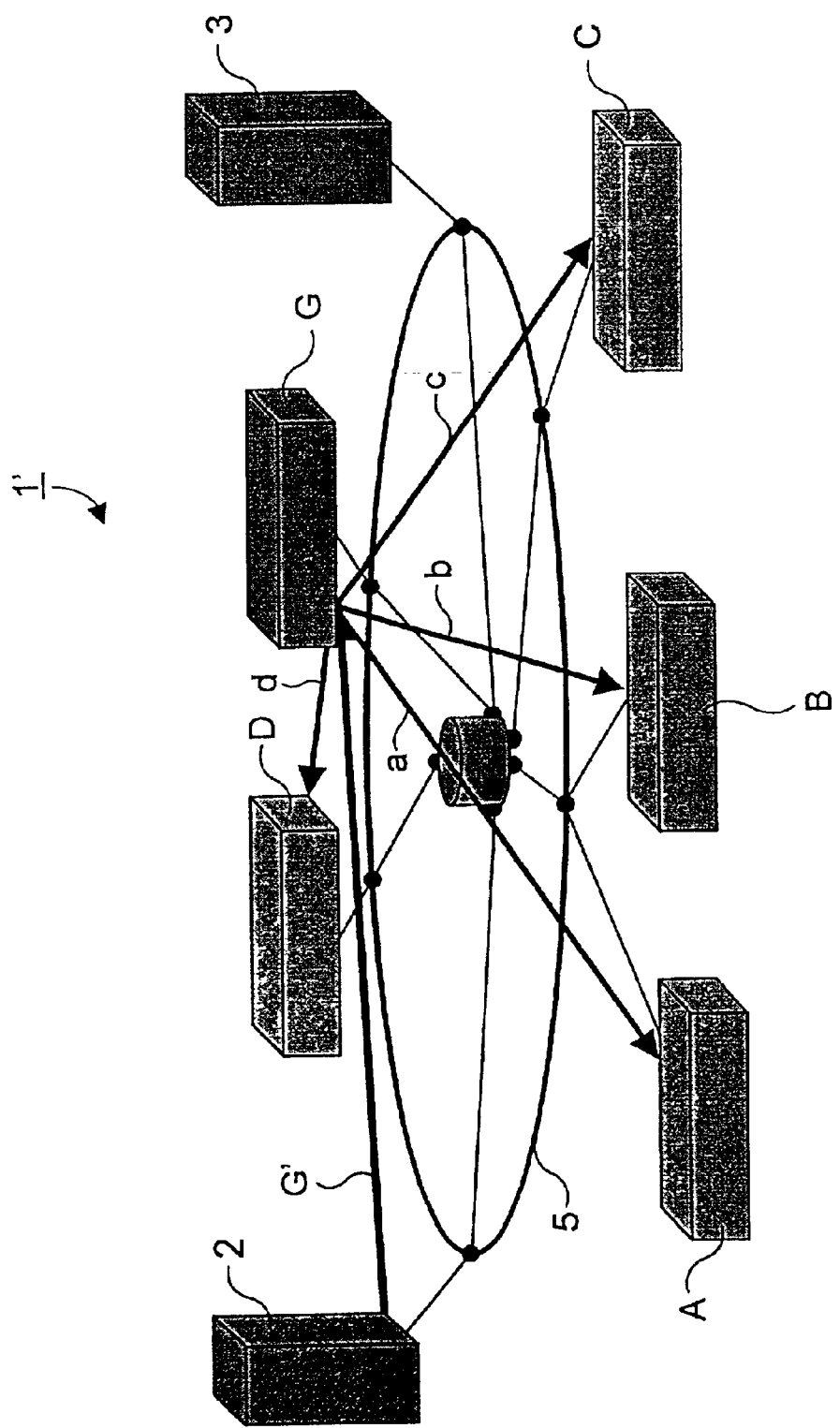
FIG. 2 shows the architecture and method principle in the invention to invoke services from several service entities.

The architecture of FIG. 2, used in the invention, the telecommunication network 1' comprises, in addition to the components in FIG. 1, i.e. 2, 3, 4, 5, A, B, C, and D, an assembler support G. When the terminal 2 wishes to invoke services from several service entities, it makes a decision whether to send the service component requests composing the service as in FIG. 1 or as in FIG. 2. In FIG. 2 it first send the set of requests to the service support 6 as indicated by the straight line G'. The assembler unit G disassembles the request in its constituent requests a,b,c,d and forwards them to the service entities A,B,C and D.

Figure 3:
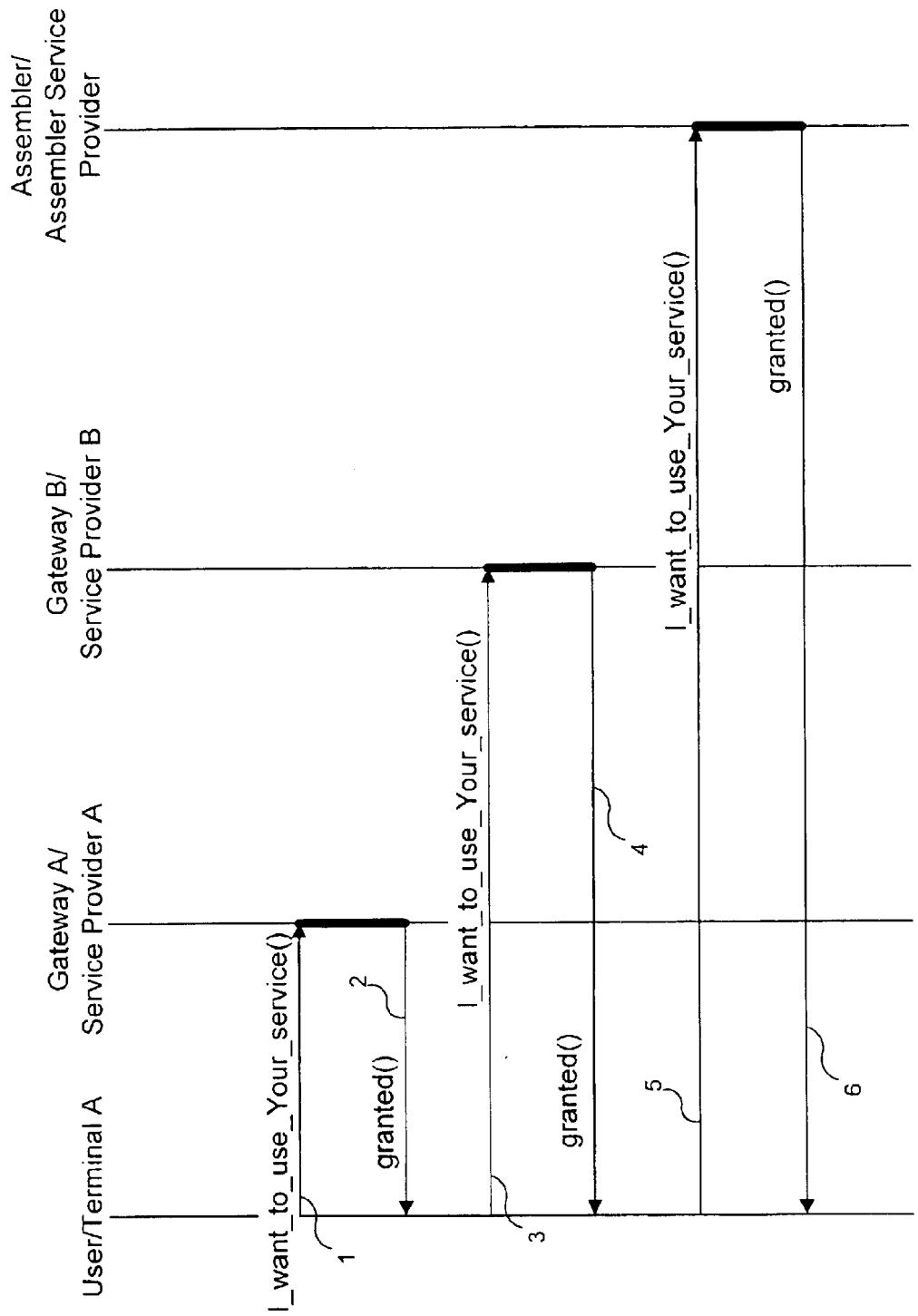
FIG. 3 shows a detailed signalling example showing the overall principle for configuring and invoking services in the existing solution.

FIG. 3 shows a detailed signalling example showing the overall principle for configuring and invoking services in the existing solution. Terminal A locates possible service entities via some unspecified mechanism known in the art. A negotiation is performed with each about the right to invoke the service provided at a later stage. The signalling messages for requesting the service from each entities A, B and C are indicated with steps 1, 3 and 5 respectively and the messages from the service entities A, B and C telling that the requests are granted are indicated with steps 2, 4 and 6 respectively.

Figure 4:
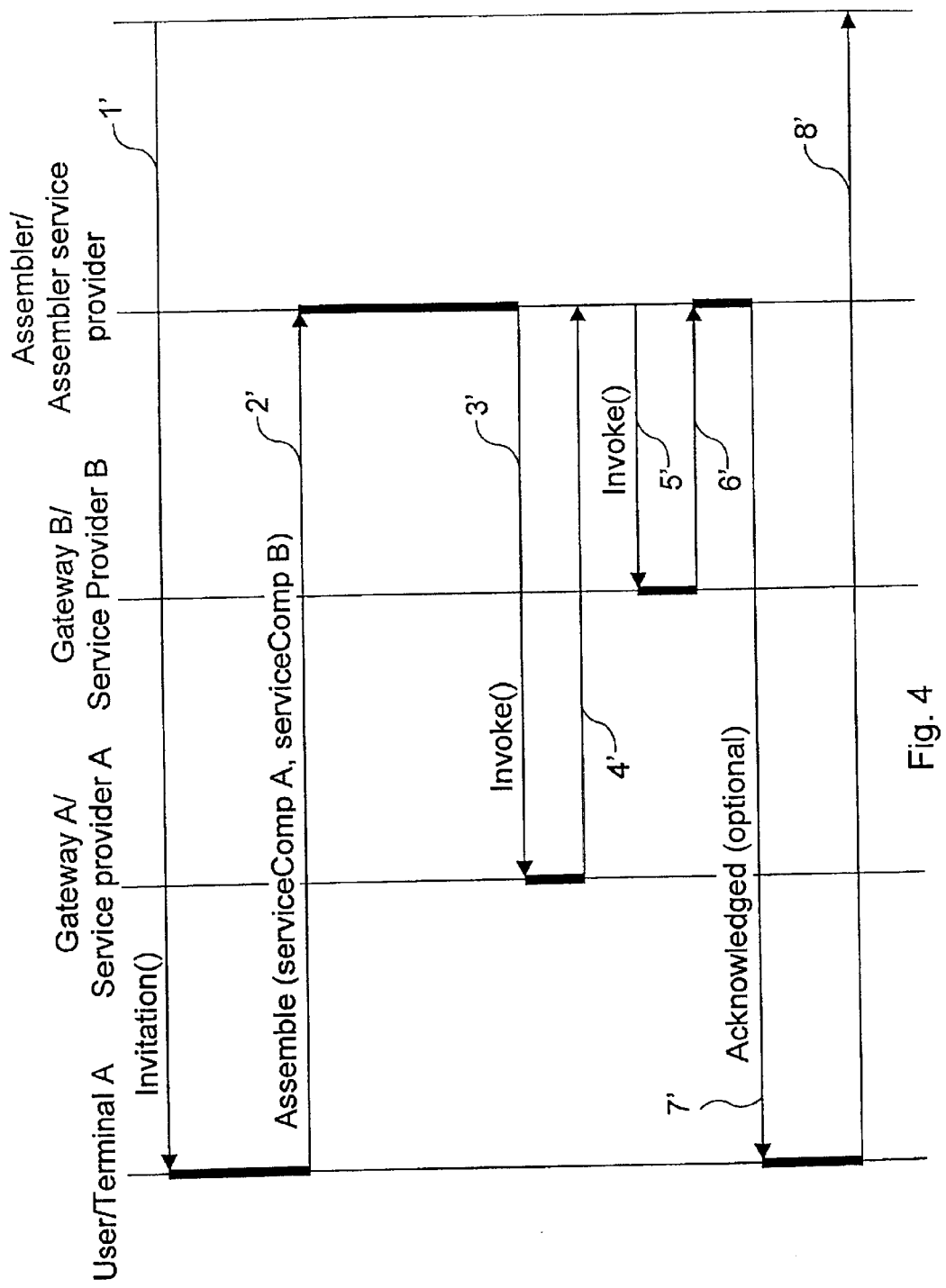
FIG. 4 shows a detailed signalling example showing the overall principle for configuring and invoking services in the invention.

FIG. 4 shows a detailed signalling example showing the overall principle for configuring and invoking services in the invention. In this signalling example, the B-terminal invites A to a session in step 1'. A determines that it requires support from service entities A and B, each providing a supporting service for the invited session. A also chooses to use the assembler unit as network support in coordinating the configuration. A therefore requests the assembler unit in step 2' to coordinate the configuration. The assembler unit invokes the desired services from the service entities in question in steps 3' and 5', the services being granted in steps 4' and 6'. In step 7', the granted services are informed to A and the session is started in step 8'.

Figure 5:
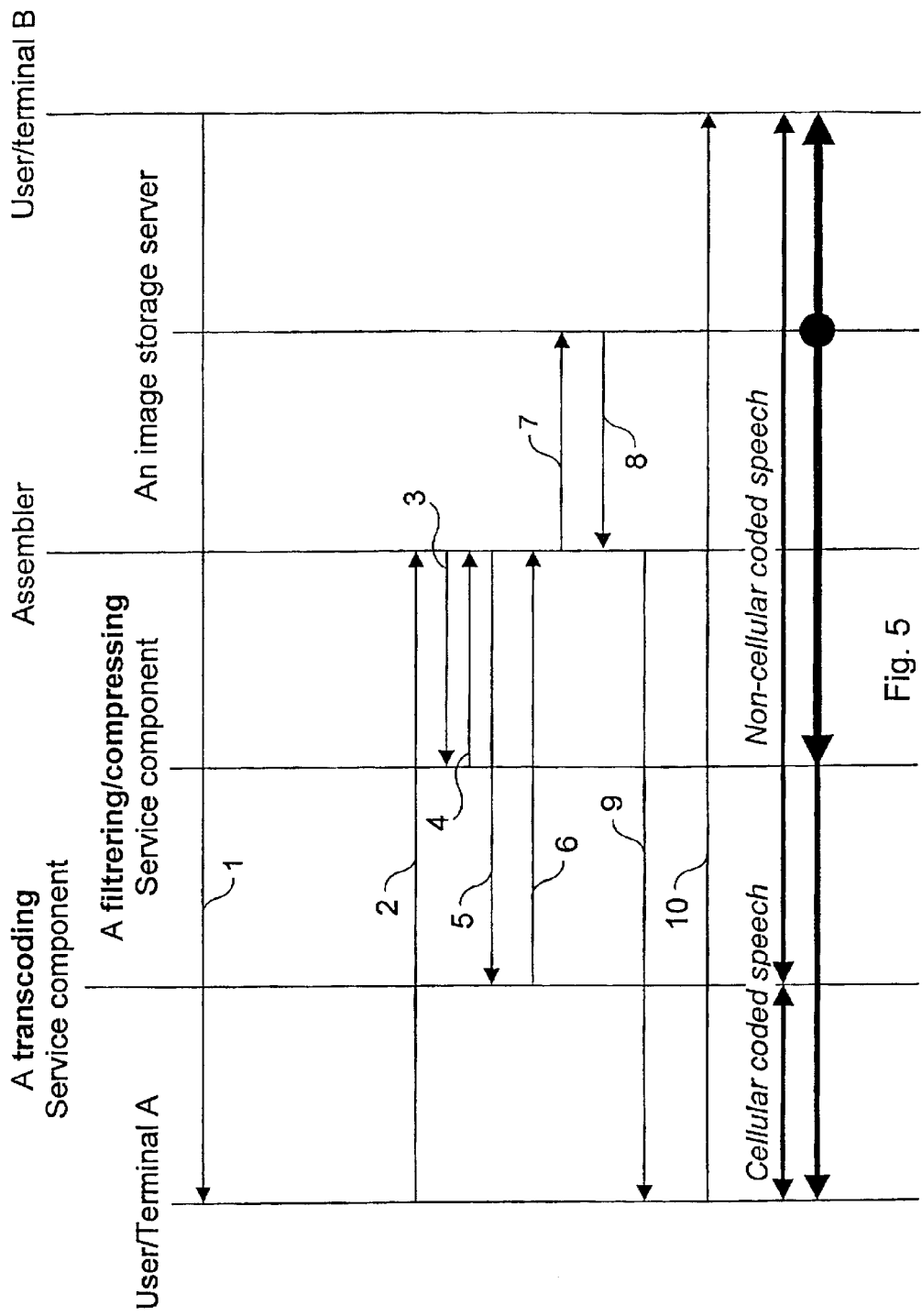
FIG. 5 shows another detailed signalling example showing the overall principle for configuring and invoking services in the invention.

FIG. 5 shows another detailed signaling example showing the overall principle for configuring and invoking services in the invention. It is assumed that two users shall communicate. During the initial session signaling, it is discovered that there is a need for a transcoding service since the two speech coders in the terminals are not compatible. It is also discovered that since one of the terminals uses a cellular access, it wishes some of the data to be compressed and irrelevant information filtered away.

Thus, to complete the service, there is a need for a transcoding service component and a compression/filtering service component in addition to the transport services.

It is assumed that A invites B to a session and A determines the need for a transcoding service and a filtering service. A has previously located such service components and agreed with the service entity that he may use them. A send a request to the assembler unit to configure these two service components as well, i.e. the transcoder and the filter. The assembler unit performs the configuration and acknowledges this to A. A responds to B and the session may start.

This is presented in detail in FIG. 5, in which B invites A to an audio session in step 1. A determines that he wishes to respond with audio and visual information exchange where the image is stored in a separate server. A also determines that he requires a filtering optimization device for the visual data stream due to the cost of the cellular access and a transcoding service for the audio data stream since the codecs in the two terminals are not compatible. In step 2, A requests the assembler unit to configure the transcoding service and the filtering/compressing service but also and end-point in which images to be exchanged between A and B is stored. In step 3, the assembler unit requests filtering/compressing from a filtering/compressing service component, and gets the filtering/compressing in step 4. In step 5, the assembler unit requests the transcoding from a transcoding service component and gets the transcoding in step 6. An image storage server is contacted by the assembler unit in step 7, the service of which is received in step 8. The assembler unit then configures the two service components and the image storage end-point and acknowledges this to A in step 9. A then responds to B in step 10 and the session starts.

The data phase is indicated by the bold arrows. The upper arrows indicates that a transcoding component is needed as an inter-working function between the terminals to convert between cellular coded speech and non-cellular coded speech. The lower arrows indicates that filtering and compressing as well as image storing takes place between the two terminals.

What is claimed is:

1. A method in a communication network for invoking services, the communication network comprising at least two service entities, the method comprising the steps of:
   a) deducing at a mobile terminal necessary support and service components for providing one or more end-user services;
   b) constructing at said mobile terminal at least one configuration request message for invoking individual service components composing said one or more end-user services;
   c) transmitting, in accordance with pre-defined criteria, said at least one configuration request message from said mobile terminal to a service invoking unit within said communications network; and
   d) receiving said at least one configuration request message at said service invoking unit, said service invoking unit operable to:
      1) determine said individual service components from said at least one configuration request; and,
      2) transmitting massages to said at least two service entities to invoke said individual service components necessary to provide said one or more end-user services to said mobile terminal, wherein all decisions about the composing of the service and the way of forwarding the requests is made by said mobile terminal, whereby said one or more end-user services are provided to said mobile terminal based one said configuration request message constructed by said mobile terminal.

2. The method recited in claim 1, wherein said pre-defined criteria are selected from the group consisting of:
   geographical position;
   price;
   signalling amounts;
   available equipment;
   spectrum allocation; and
   desired performance or characteristics.

3. A mobile terminal for use in a wireless communications network, the communications network comprising at least two service entities, said terminal comprising:
   a) means for deducing, at said mobile terminal, necessary support and service components for providing one or more end-user services;
   b) means for constructing, at said mobile terminal, at least one configuration request message for invoking individual service components composing said one or more end-user services;
   c) means for transmitting, in accordance with pre-defined criteria, said at least one configuration request message from said mobile terminal to a service invoking unit within said wireless communications network, wherein, upon receiving said at least one configuration request message at said service invoking unit, said service invoking unit is operable to:
      1) determine said individual service components from said at least one configuration request; and,
      2) transmit messages to said at least two service entities to invoke said individual service components necessary to provide said one or more end-user services to said mobile terminal, wherein all decisions about the composing of the service and the way of forwarding the requests is made by said mobile terminal, whereby said one or more end-user services are provided to said mobile terminal based one said configuration request message constructed by said mobile terminal.

4. The mobile terminal recited in claim 3, wherein said pre-defined criteria are selected from the group consisting of:
   geographical position;
   price;
   signalling amounts;
   available equipment;
   spectrum allocation; and
   desired performance or characteristics.

5. A service invoking unit for use in a wireless communications network, the communications network comprising at least two service entities, said service invoking unit comprising:
   1) means for receiving at least one configuration request message at said service invoking unit, from a mobile terminal, wherein said mobile terminal is operative to:
      a) deduce necessary support and service components for providing one or more end-user services;
      b) construct said at least one configuration request message for invoking individual service components composing said one or more end-user services; and c) transmit, in accordance with pre-defined criteria, said at least one configuration request message from said mobile terminal to said service invoking unit within said communications network; and 2) means for determining said individual service components, at said service invoking unit, from said at least one configuration request; and, 3) means for transmitting messages to said at least two service entities to invoke said individual service components necessary to provide said one or more end-user services to said mobile terminal, wherein all decisions about the composing of the service and the way of forwarding the requests is made by said mobile terminal, whereby said one or more end-user services are provided to said mobile terminal based one said configuration request message constructed by said mobile terminal.

6. The service invoking unit recited in claim 5, wherein said pre-defined criteria are selected from the group consisting of:

geographical position;

price;

signalling amounts;

available equipment;

spectrum allocation; and desired performance or characteristics.

* * * * *

UNITED STATES PATENT AND TRADEMARK OFFICE
CERTIFICATE OF CORRECTION

PATENT NO. : 6,920,490 B2  Page 1 of 1
APPLICATION NO. : 09/839100
DATED : July 19, 2005
INVENTOR(S) : Eriksson et al.

It is certified that error appears in the above-identified patent and that said Letters Patent is hereby corrected as shown below:

On the Title Page, Item (57), under "ABSTRACT", in Column 2, Line 3, delete "comprising" and insert -- including --, therefor.

On the Title Page, Item (57), under "ABSTRACT", in Column 2, Line 6, after "requests is" delete "the".

In Column 5, Line 66, in Claim 1, delete "massages" and insert -- messages --, therefor.

In Column 6, Line 6, in Claim 1, delete "one" and insert -- on --, therefor.

In Column 6, Line 43, in Claim 3, delete "one" and insert -- on --, therefor.

In Column 7, Line 15, in Claim 5, delete "one" and insert -- on --, therefor.

Signed and Sealed this

Ninth Day of September, 2008

JON W. DUDAS
*Director of the United States Patent and Trademark Office*